US008634688B2

(12) United States Patent
Bryon et al.

(10) Patent No.: US 8,634,688 B2
(45) Date of Patent: Jan. 21, 2014

(54) HOUSING FOR AN OPTICAL FIBER CABLE ASSEMBLY (75) Inventors: Roel Modest Willy Bryon, Aarschot (BE); Kristof Vastmans, Boutersem (BE); Danny Willy August Verheyden, Gelrode (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 202 days.

(21) Appl. No.: 13/148,645

(22) PCT Filed: Feb. 5, 2010

(86) PCT No.: PCT/EP2010/051436
§ 371 (c)(1),
(2), (4) Date: Aug. 9, 2011

(87) PCT Pub. No.: WO2010/092009
PCT Pub. Date: Aug. 19, 2010

(65) Prior Publication Data
US 2011/0311193 A1 Dec. 22, 2011

(30) Foreign Application Priority Data

Feb. 10, 2009 (EP) .................................... 09001855

(51) Int. Cl.
*G02B 6/00* (2006.01)
(52) U.S. Cl.
USPC ......................................................... 385/135
(58) Field of Classification Search
USPC .................................. 385/134–137
See application file for complete search history.

(56) References Cited

U.S. PATENT DOCUMENTS

| 5,789,707 A | 8/1998 | Damm et al. |
| 6,215,939 B1 | 4/2001 | Cloud |

(Continued)

FOREIGN PATENT DOCUMENTS

| EP | 0808008 A1 | 11/1997 |
| WO | WO 97/41474 | 11/1997 |
| WO | WO 97/45904 | 12/1997 |

OTHER PUBLICATIONS

International Preliminary Report on Patentability, issued by The International Bureau of WIPO, Geneva, Switzerland, dated Aug. 16, 2011, for related International Application No. PCT/EP2010/051436; 5 pages.

(Continued)

*Primary Examiner* — Daniel Petkovsek
(74) *Attorney, Agent, or Firm* — Faegre Baker Daniels LLP (57) ABSTRACT The present invention relates to a housing, in particular for an optical fiber assembly with improved sealing characteristics comprising an housing upper body (38) and an housing lower body (2), upper and lower sealing pads (32; 42) made of a gel sealing material, each of said pads (32; 34) being received in a trough (12, 46) provided by the housing upper and lower body (2; 38), respectively, wherein between said upper and lower pads (38; 48) are adapted to seal an element (78), which can be introduced into said housing, wherein at least one of said pads (42) is held by a retaining device (44) which is elastically supported against one of said housing bodies (38) by means of a spring element (47) and wherein the other of said housing bodies and/or said retaining device (44) provides a contoured abutment surface (26; 70) for the assigned pad (32; 42).

17 Claims, 5 Drawing Sheets (56) References Cited

U.S. PATENT DOCUMENTS 6,231,055 B1 * 5/2001 Dams et al. .................. 277/602
6,344,615 B1    2/2002 Nolf et al.
6,744,962 B2 * 6/2004 Allerellie ..................... 385/135
6,802,512 B2 * 10/2004 Muller et al. ................ 277/607

OTHER PUBLICATIONS

International Search Report and Written Opinion issued by the European Patent Office, dated Mar. 22, 2010, for PCT/EP2010/051436; 13 pages.
European Search Report issued by the European Patent Office, dated Apr. 2, 2009, for EP09001855; 6 pages.

* cited by examiner

HOUSING FOR AN OPTICAL FIBER CABLE ASSEMBLY

The present application is a 371 of PCT/EP10/51436 dated Feb. 5, 2010, wherein the present application relates to a housing comprising a housing upper body and a housing lower body. These housing bodies are usually made by injection moulding of a plastic material. Between said upper and lower housing bodies, there are provided upper and lower pads made of a gel sealing material. One of these pads is assigned to the housing upper body and is received in a trough provided by said housing upper body. The other seal pad is assigned to the housing lower body and received within a trough of said housing lower body.

Such housing is used for hermetically sealing the inner chamber provided by the housing which can be used to mount element which are particularly sensitive to humidity. The housing according to the present invention is in particular suitable for an optical fiber assembly in which the jacket of at least one optical fiber element is removed thereby exposing the optical fiber element. This exposed length of optical fiber element is in particular sensitive to humidity and/or water as the same will mechanically weaken the mechanical properties of the optical fiber elements upon prolong exposure and thus alter the capability of the optical fiber element to transmit optical signals.

In particular for fiber elements gel sealing material is known to seal the housing tightly and around the element to be introduced into the housing.

This gel sealing material is a highly viscous liquid which can be regarded as a pseudo plastic or non-Newtonian fluid (cp. EP 0 426 658 B1 and EP 0 681 598 B1). In other words, the gel sealing material has the capability to flow within the troughs provided by the housing upper and lower body. Such capability is used to fully seal an element which can be introduced into said housing by passing the cable between the pads into the housing. On a general basis, the optical cable is clamped between the upper and lower pads after closing the housing, i.e. after clamping the two housing bodies against each other. In prior art, it is known to provide at least one spring element which is elastically supported against one of said housing bodies and which exerts an elastic force against the gel sealing material. This elastic force is introduced into the gel sealing material by a retaining device which holds a pad made of a gel sealing material. The elastic force stored in the spring element is to force the gel sealing material into any void between the housing upper and lower body in the region of the two troughs provided by those housing bodies.

Nevertheless, complete sealing of the housing at a port for an optical cable, i.e. the location at which the at least one optical cable is introduced into said housing is still troublesome. A possible location of leakage is the so-called triple point. This triple point is provided at the lateral edge of the trough in the middle of the trough in the direction of insertion of the cable where the gel sealing material presses against the surface provided by the housing body on one hand and where a sealing inlet received in a groove formed in the housing body terminates in said trough. At this triple point, three different materials meet which are to maintain complete sealing of the housing at that point.

Furthermore, the gel sealing material may slowly flow by the force of the pressure into each cavity surrounded by the troughs. However, due to the very high viscosity of the gel sealing material, immediately after closing the housing, such process may be too slow for preventing humidity from entering the housing.

Introduction of humidity or even water is by no means tolerable in a housing for an optical fiber assembly as such humidity will form a water film on the outer surface of optical fiber elements being exposed within said housing. Optical cables are only one example which are to be sealed tightly in case of exposing an optical fiber element by removing the jacket. However, technological fields are thinkable in which such need exists. For example, there will be the need to tightly seal electric or electronic components against a humid and/or aggressive environment. Furthermore, metal parts within a joint which are sensitive to corrosion may need to be protected from humid atmosphere. In each of both cases, which are presented as examples, a cable or any other elongated element is to be introduced into the housing by passing between the sealing pads.

It is an object of the present invention to provide a housing with improved sealing.

In order to solve the above object, the present invention provides a housing for an optical fiber assembly as defined in claim 1.

The present invention is based on the concept that the abutment surface provided by one of the housing bodies and/or the retaining device is contoured. The respective housing body is the one of both housing bodies which is not holding the retaining device with at least one spring element sandwiched in between. In other words, the usually flat abutment surface for the pads of gel sealing material is contoured. It has been observed by the inventors, that specific contours provided in the trough receiving the pad made of gel sealing material, in particular, the abutment face being arranged parallel to the direction of introduction of the optical cable into the housing, should be contoured in order to assist intermediate closing of all voids by flowing gel sealing material. Contours are to be provided such, that flow of the gel sealing material into critical areas, where voids usually persist for a long time in the area of contact between both pads and/or the pads and the walls forming the trough and/or between the pads and the circumferential surface of the element introduced into the housing is improved. The contour of the housing acts as a displacer, which protrudes into the gel sealing material when closing the housing, thereby initiating a flow of the gel sealing material into critical areas. In a simple configuration, the contour acting as a displacer is pressed against a flat outer surface of the gel sealing material. Preferably, the displacer is protruding from a flat abutment face for the gel sealing material, whereas the gel sealing material has an abutment face extending in parallel with this flat abutment face. In other words, the contour acts as a displacer perpendicular against the flat abutment face of the gel sealing material.

The element according to the present invention in particular is an optical cable. The optical cable in the meaning of the present invention is a cable which can comprise a single optical fiber element surrounded by a jacket or plural optical fiber elements surrounded by at least outer jacket. Plural optical fiber elements may be grouped wherein each group can be surrounded by a jacket, the group of optical fiber elements are surrounded by the outer jacket of the optical cable. Within said housing, selected optical fiber elements of said optical cable can be spliced or separated from other optical fiber elements and passed to the outside of said housing for collected said separated optical fiber element.

According to one preferred embodiment of the present invention, there is provided at least one rim extending in a direction transverse to the direction of introduction of the element. Said rim is preferably provided in the middle part of the bottom with respect to the direction of introduction of said cable. Practical tests have proven that such rim will push the highly viscous gel sealing material of one pad towards the contacting area of both pads. Specifically, the gel sealing material will be pushed in the middle section of an element received between both pads thereby preventing the gel sealing material from oozing out from the area of mutual contact between the pads.

The aforementioned rim usually projects an essentially flat abutment face of the other of said housing bodies and/or said retaining device thereby improving the instantaneous sealing of the housing upper and housing lower body in the sealing area provided by both pads.

According to another preferred embodiment, the rim has a height which is projecting the flat bottom of the trough corresponding to 3% to 15% preferably corresponding to 5% to 10% of the maximum height of the pad. The maximum height is the extension of the pad in a direction perpendicular to the direction of introduction of the element. The maximum height corresponds to the maximum extension of the pad from the bottom of the trough to the surface of the pad providing a contact surface for the other of both pads. The rim should have a height of between 1 to 5 mm, preferably of between 2 and 3 mm. The height of the rim may change in longitudinal direction depending on the actual height of the signal of the pad. With increasing height of the pad, the height of the rim will likewise rise.

In another preferred embodiment of the present invention, the contour provided by the other of said housing bodies and/or the retaining device is to assist in instantaneously closing of the periphery of the element. In view of this, one of said pads is provided with at least one recess for receiving the element. The housing body or retaining device assigned to the other of said pads, comprises projections. These projections are directed towards the one of said pads and adjacent to a lateral wall of said recess. The lateral wall of said recess usually extends in a direction perpendicular to the direction of introduction of the element into the housing and usually rectangular to a parting plane provided between the two housing bodies. The respective projections are formed such that gel sealing material is forced to deform and flow against the outer circumferential surface of the element thereby fully enclosing the element between both pads. While one of said pads may form a pronounced recess for receiving the entire diameter of the element, the other of said pads may be provided with a dent. Such dent is arranged opposite to said recess and with the width essentially corresponding to the width of the recess. Such preferred embodiment provides, in particular, rapid sealing of an element having a fairly large diameter.

The aforementioned preferred embodiment should be accompanied by a further preferred embodiment according to which the surface of said one pad is contoured so as to form a hutch. The higher part of the hutch forms the rim of the recess while a lower part of the hutch is provided opposite to the projection. In the case of closure of the housing, the projection will force the material from the lower part of the hutch to flow towards the recess thereby enclosing the outer peripheral surface of the element. The hutch may have higher parts forming a triangle with one surface being the surface of the hutch and the other being formed by the lateral wall of the recess. Such pronounced triangular form may be received within the dent upon closure of the housing, thus avoiding excessive punctual compression force.

According to another preferred embodiment, at least one of said pads is sandwiched between lateral holding members. Each of said lateral holding members have a bottom contour corresponding to that of the bottom of the assigned housing body. With this preferred design, the pad is laterally sandwiched and thus prevented from oozing out of the trough. Corresponding bottom contours of the holding members and the assigned housing body prevents a substantial gap formed between the two rigid elements through which the viscous gel sealing material could flow. The lateral holding members are preferably provided for said one of both pads which is received in the trough and not held by the retaining device.

According to yet another preferred embodiment, each of the holding members have a recess aligned with said element receiving recess of the pad sandwiched between the holding members. The element receiving recess is slightly smaller than the holding member recess. The recesses provided in the holding member give support to the gel sealing material thereby preventing the same from oozing out from the contact area while providing sufficient tolerance for the gel sealing material to flow and thereby slightly alter the position of the element relative to the rigid lateral holding members. In other words, the slightly larger recesses of the lateral holding members prevent the cable from contacting the rigid part of the closure due to the desired flow of the gel sealing material to fully encapsulate the element.

According to a further preferred embodiment, the lateral holding members are recessed between bottom holding rims projecting from the bottom of the assigned housing body thereby preventing the lateral holding members from being pushed in the direction of introduction of the element by the compression force of the gel sealing material.

To facilitate assembly of the housing, the lateral holding members preferably have holding pins which are received in pin receiving openings formed in the pad thereby allowing preassembly of the two lateral holding members with the one pad. This preassembled element can be inserted into the trough of the assigned housing body.

According to a further preferred embodiment which facilitates introduction of further element into the housing, the one of said pads is provided with at least one optional recess for receiving an optional element. Further, the housing is equipped with a insert which is received in the housing. Preferably, the insert is inserted as a separate member into a recess formed in one of the housing bodies. Such insert is adapted to hold the at least one of said elements. For this, the insert will usually form guidance of the cable and means adapted to secure the element on said insert. A respective insert is usually provided to assist splicing of individual optical fibre elements and, in particular, to hold a splice provided to connect two optical fibre elements with each other. According to the preferred embodiment of the present invention, the insert is projected by at least one cable dummy which is aligned with the at least one optional recess. The cable dummy is formed usually as a unitary body with the insert. On a regular basis, such a cable dummy is injection moulded together with the insert and connected to the insert by a film-like element which can be shorn off usually without the assistance of a tool. Due to this specific design, the cable dummy is held in place and inserted into the optional recess as long as no optional cable is introduced into the housing through the optional recess. In case an optional element is to be received in said optional recess, the person performing this assembly can easily shear or tear-off the cable dummy thereby making the optional recess free to receive the optional cable. The cable dummy usually has a diameter essentially corresponding to the diameter of the optional cable. However, due to the viscous properties of the gel sealing material, certain variations of diameter between the diameter of the cable dummy and the optional cable can be allowed without losing tight sealing by the gel sealing material of both the cable dummy and the element provided instead.

The present invention will now be described in further detail by referring to a preferred embodiment depicted in the accompanying drawings. In these drawings.

Figure 1:
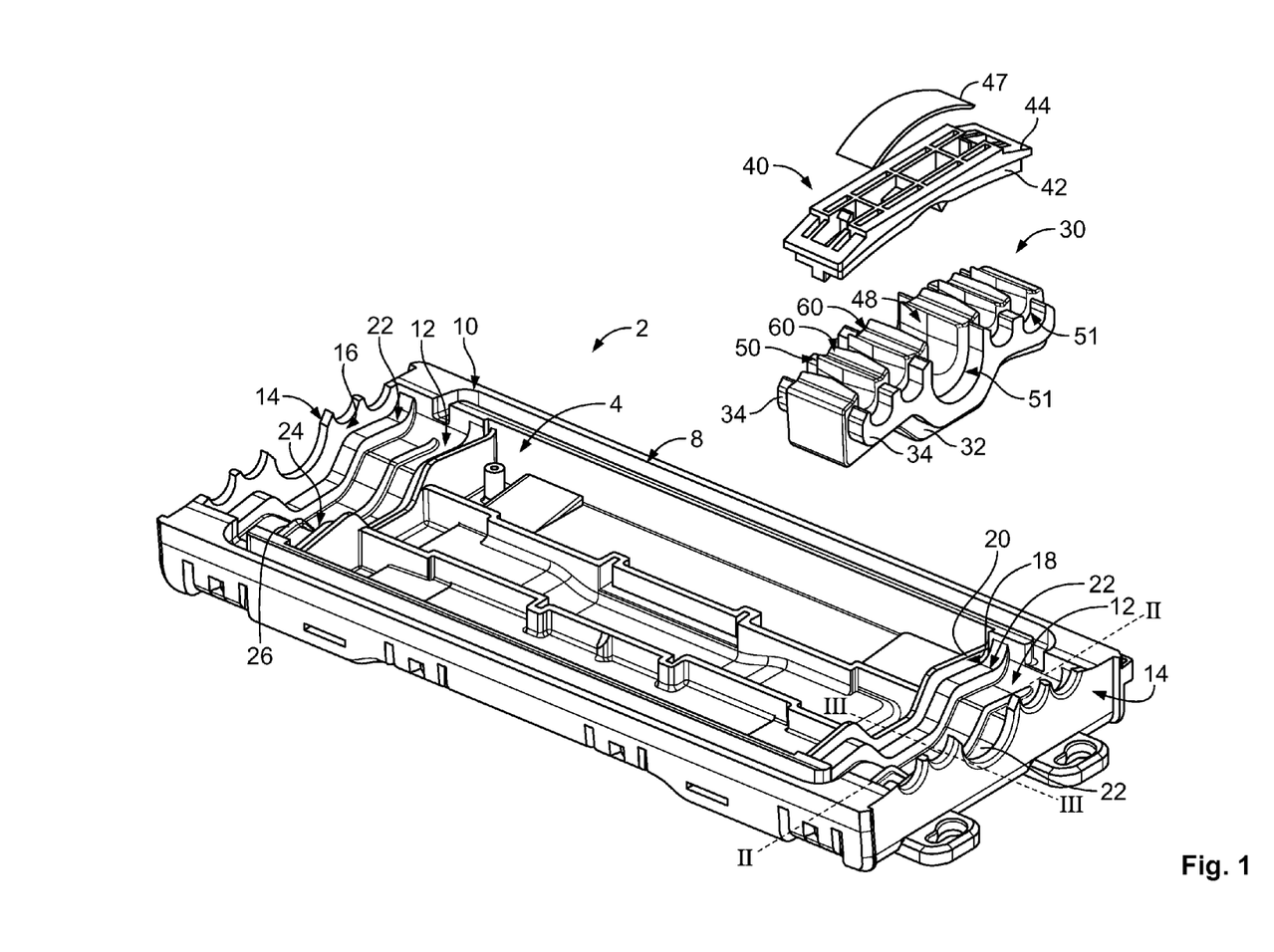
FIG. 1 shows a respective top view of a housing lower body with exploded representation of the upper and lower pads.
Figure 4:
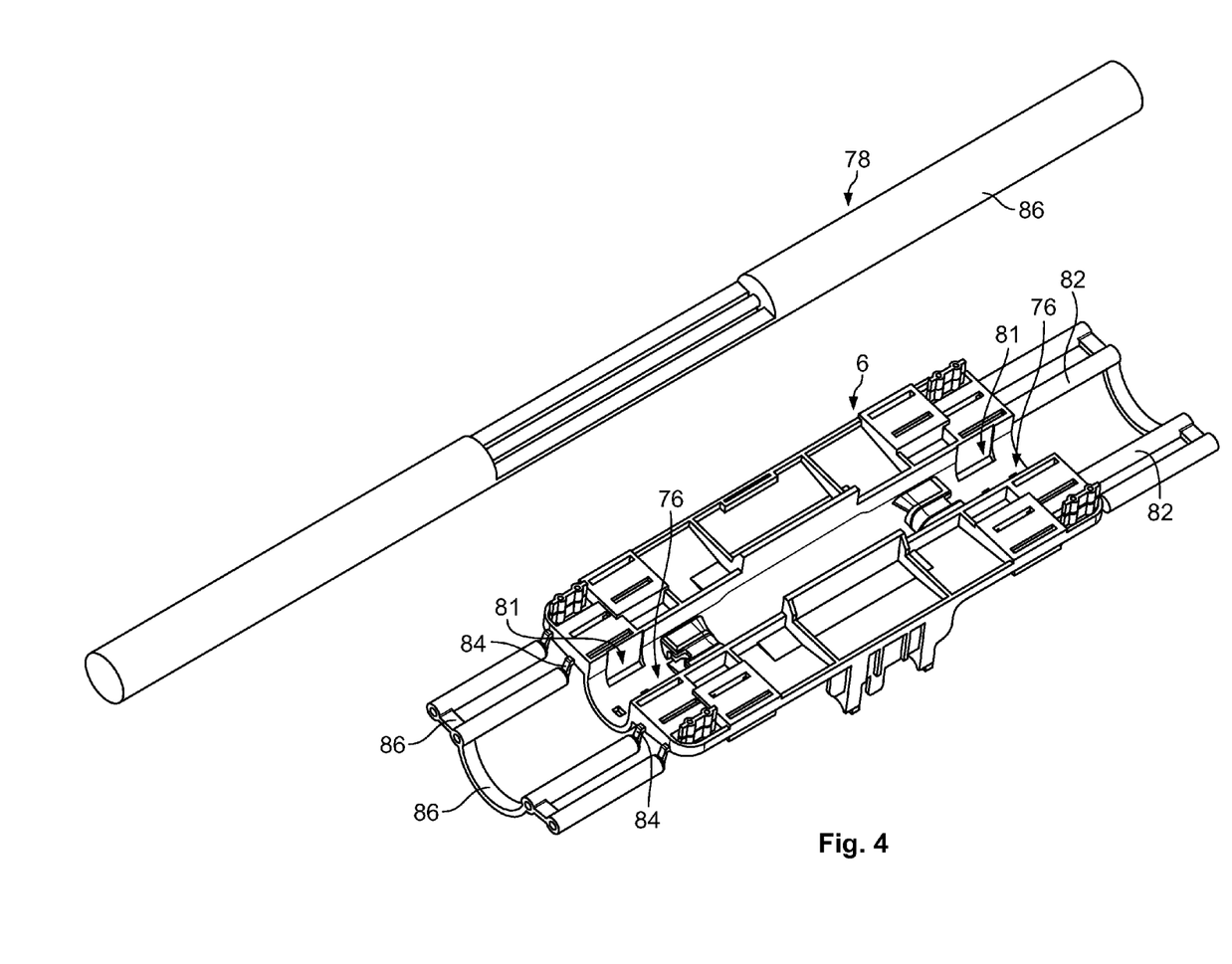
FIG. 4 shows a insert and a section of an optical cable to be introduced into the housing of FIGS. 1 through 3.

FIG. 1 shows a housing lower body 2 which forms an insert receiving recess 4 for receiving an insert 6 which is depicted in FIG. 4. The housing lower body 2 has lateral seal groves 8 which are open to the parting plane 10 of said housing lower body 2 and are adapted to receive a lateral sealing element which is not shown. The lateral seal groves 8 extend essentially parallel to the longitudinal sides of the housing lower body 2. The ends of those seal groves 8 are directed inwardly and towards each other. Those end portions of the seal groves 8 terminate in a trough 12. There are provided two troughs 12 each of them adjacent to a lateral front face 14 of the housing lower body 2.

In longitudinal direction of the housing lower body 2 corresponding to the direction of introduction of an optical cable into the trough 12 is limited by the inner surface 16 of front face 14 on one hand and by the inner surface 18 of an inner holding rim 20 provided between the trough 12 and the insert receiving recess 4. Projecting from these inner surfaces 16, 18, holding member rims 22 are provided, the surface thereof extending parallel to the direction of introduction of the optical cable and following the contour of each trough 12. Those holding member rims 22 are provided elevated from a bottom 24 of each trough 12. In the middle between the holding member rims 22 of one trough 12, there is provided a rim 26 projecting the bottom 24 of the each trough 12.

Identified with reference numeral 30 there is shown a sealing element 30 for sealing the trough 12 of the housing lower body 2. This sealing element 30 is composed of a lower pad 32 of a gel sealing material which is sandwiched between two identically formed lateral holding members 34. Each of said lateral holding members 34 are provided with holding pins (not shown) which are received in pin receiving openings identified with reference numeral 36 in FIG. 2 and being recessed in the lower pad 32. The sealing element 30 is adapted to fit into the trough 12 between the inner surfaces 16, 18. The thickness of each lateral holding member 34 corresponds to the extension of the holding member rims 22 in longitudinal direction of the housing lower body 2. Furthermore, the contour formed by the bottom part of the lateral holding members 34 and the holding member rims 22 are identical. Accordingly, the lateral holding member 34 can rest on the assigned holding member rim 22. The lower pad 32 projects the lower side of each lateral holding member 34 thereby thoroughly contacting the bottom 24 of each trough 12. In the initial state, the lower surface of the lower pad 32 is flat. When inserted into the trough 12, this flat bottom surface of lower pad 32 presses against rim 26 which forms a compression rim for locally protruding into the gel sealing material of lower pad 32.

Figure 2:
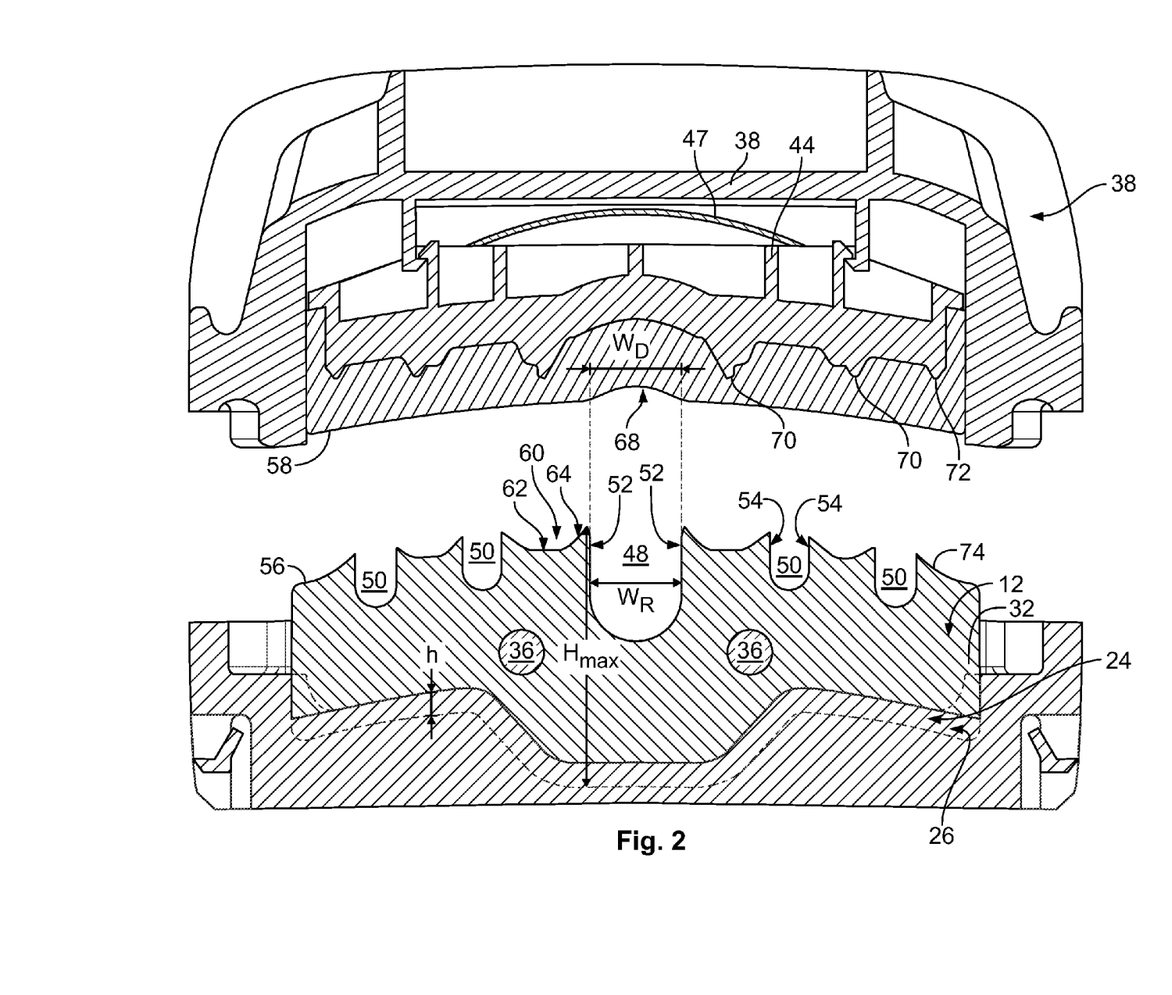
FIG. 2 shows a cross-sectional view along line II-II according to FIG. 1 before fully closing the housing.

The height h of said rim 26 in a direction perpendicular to the to the direction of introduction of the optical cable and approximately normal to the surface provided by the bottom 24 is about 3 mm of the maximum height $H_{max}$ of the pad 32 in respective direction (cp. FIG. 2).

Furthermore, the housing has a housing upper body, identified with reference numeral 38 in FIG. 2 and which is provided with a trough 46 adapted to receive an upper sealing element 40 which is identified with reference numeral 40 in FIG. 1. This upper sealing element 40 comprises an upper pad 42 and a retaining device 44 which is adapted to hold the upper pad 42 and movably secured to the trough 46 of the housing upper body 38 (compare FIG. 2).

As can be seen from FIG. 2, the lower pad 32 comprises a main recess 48 for receiving a main optical cable and two optional recesses 50 formed on both sides of the main recess 48. Concentrically arranged to those recesses 48, 50 the lateral holding members 34 each form recesses 51 which are slightly larger than the recesses formed in the lower pad 32. Such arrangement gives sufficient support for the highly viscous gel sealing material, in order not to ooze out from the sealing area, but provides some degree of movability of an optical cable received in any of the recesses 48, 50 without direct contact between those cables and the ridged material of the lateral holding members 34. Each of said recesses 48, 50 has a semi-circular shaped base formed as a cylinder extending in the direction of introduction of the optical cable. This semi-circular section merges into lateral walls identified with reference numeral 52 for the main recess 48 and with reference numeral 54 for the optional recesses 50. The upper surface of the lower pad 32 which forms a sealing surface 56 cooperating with a sealing surface 58 of the upper pad 42 is contoured. Within this contour, between each recess 48, 50, there are provided hutches 60, the lower part 62 of which, is positioned in a middle section between the recesses 48, 50, and the upper part 64 of which is formed with a triangular contour. In said triangular contour the upper part 64 forms a ramp which connects an edge of the hub and the lower part 62. The edge of this ramp is the intersection between the ramp and the lateral wall 52 or 54 of the main or the optional recess 48, 50, respectively.

The sealing surface 58 of the upper pad 42 is essentially roof-shaped with a slight inclination towards the middle. This middle is formed with a slight dent 68 provided opposite to the main recess 48. The width $W_D$ of said dent 68 essentially corresponds with the width $W_R$ of the recess 48 opposed to said dent 68. Opposite to each lower part 62 of each hutch 60, the retaining device 44 forms projections 70 which project into the gel sealing material of upper pad 42. Further, the retaining device 44 provides lateral projections 72 which are arranged opposite to lateral ramps 74 provided between the outermost optional recesses 50 and the lateral edge of the lower pad 32. As evident from FIG. 5, the respective projections 70, 72 project from the compression ring 26 a base 75 which is flat in the direction of extension of the optical cable. This base 75 is separated into two lateral sections, which are inclined relative to each other and merge into a dent 77 provided in the center of the retaining device 44.

Figure 5:
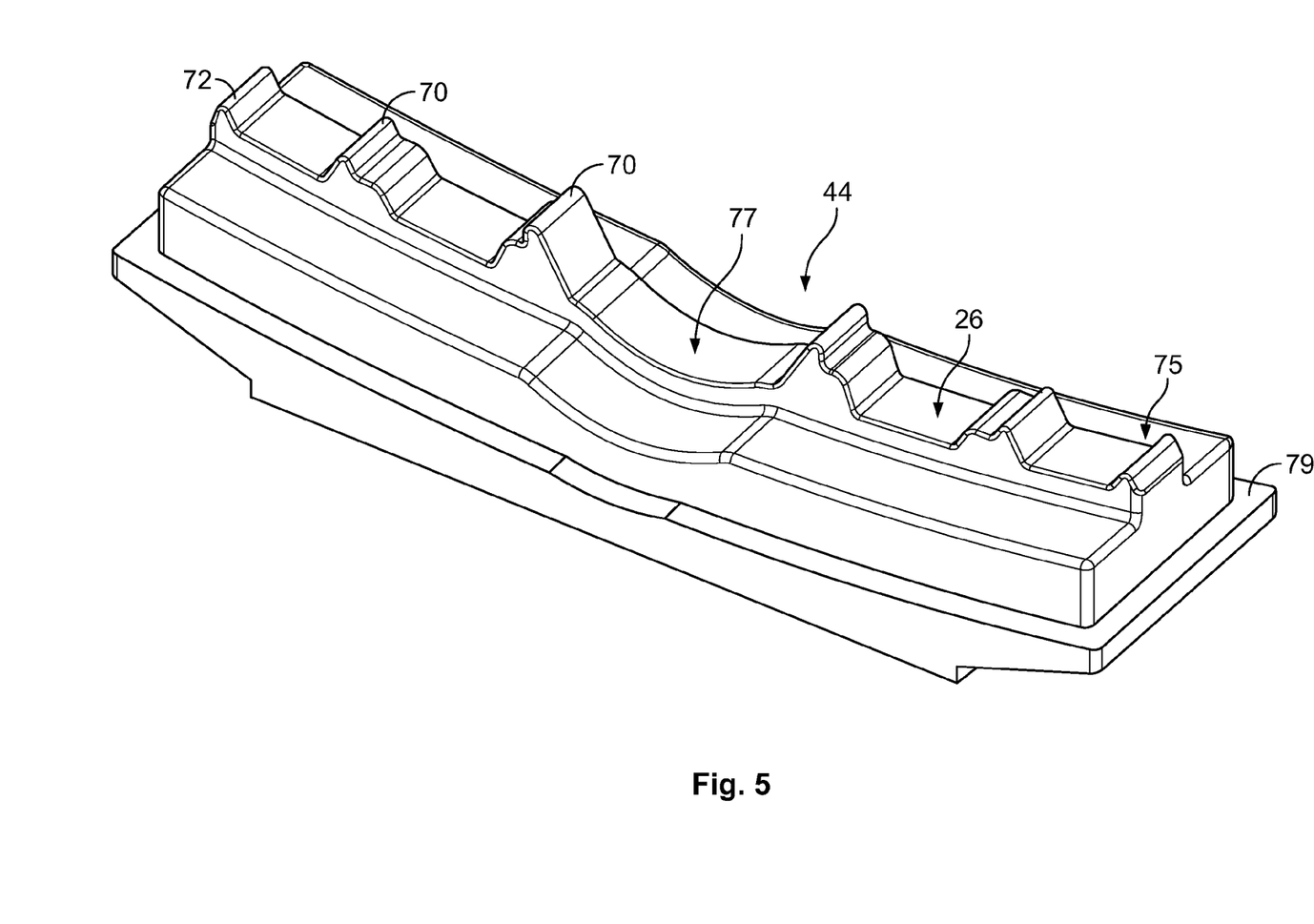
FIG. 5 shows a perspective top view of a retaining device for the upper pad.

As evident from FIG. 5, each of the projections 70, 74 have a plane surface in the direction of insertion of the optical cable, i.e. the surface of those projections in this direction extends parallel to the partition plane 10 when the retaining device is mounted in the housing. The width in the respective direction of the projection 70, 72 corresponds to the width of the compression rim 26 which is approximately one fourth of the extension of a base 75 in the respective direction. This base 75 is arranged above a circumferential rim 79. Accordingly, the upper pad 42 is projected by a dome of the retaining device 44 allowing form fit holding of the upper pad 42 against the retaining device 44.

FIG. 4 shows a perspective bottom view on the lower side of the insert 6 providing a guide 76 for receiving an optical cable identified with reference numeral 78 the jacket 80 of which is partially cut away to provide secure and predetermined holding of the optical cable 78 within the insert 6. The optical cable 78 can be secured to the insert 6 in any known manner, in particular, by using T-wraps or hole clamps passing through recesses 81 formed in the insert 6 and partially surrounding the jacket 80 of the optical cable.

For the embodiment shown of a housing, the insert 6 is projected by four cable dummies 82 of identical diameter. Due to the flowability of the pads the diameter of the dummy and the diameter of a cable which is to replace the dummy can vary to a certain extent. In the present embodiment, the insert 6 is made by injection moulding as a unitary body together with the cable dummies 82, the same being connected to the main body of insert 6 by film element 84 which can be shorn off manually by a person connecting said optical cable in order to remove selected cable dummies 82. On their free end, the cable dummies 82 are mutually connected by a support film element 86. The film element 84 and the support film 86 maintain a parallel alignment of all cable dummies 82 and are adapted to be manually shown off in case of connecting an auxiliary cable to the insert 6. The central section of the support film element 86 is arc-shaped to bypass the main optical cable 78 passing into the housing 2, 40.

For assembly of the housing, the optical cable 78 is attached to the insert 6. This insert 6 is inserted into the insert receiving recess 4 of the housing lower body 2. In this position, the cable dummies 82 are each aligned to the optional recesses 50 provided in the lower pad 32. Thus, the optional recesses 50 are essentially filled with material. The main recess 48 receives optical cable 78 and partially encloses the outer circumference of the jacket 80 of said cable 78.

Figure 3:
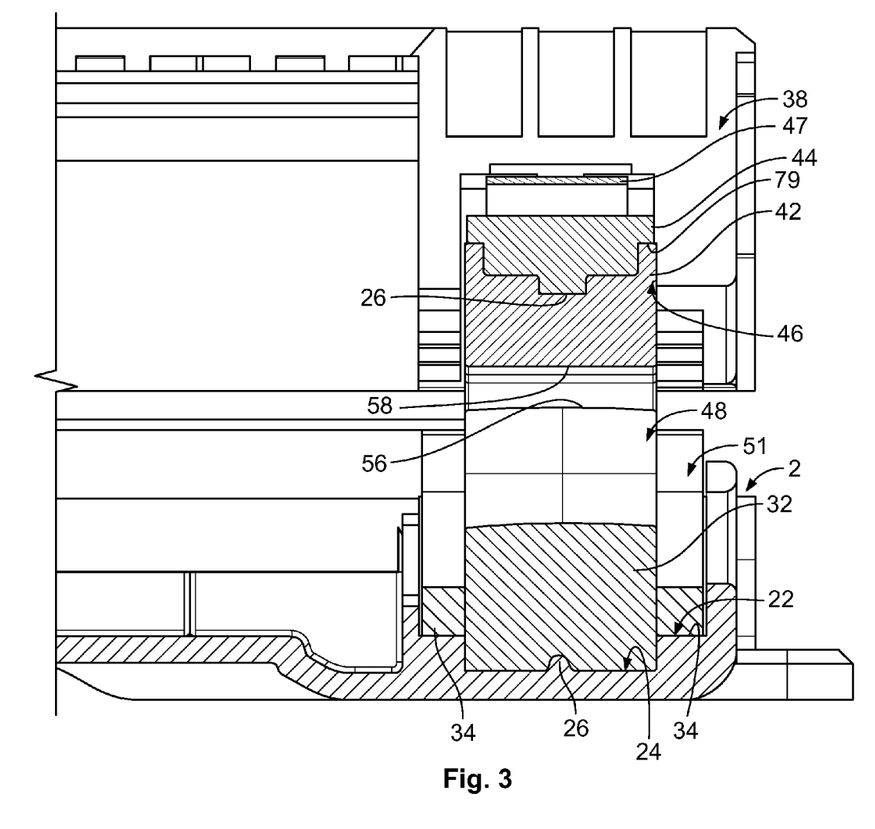
FIG. 3 shows a cross-sectional view along line III-III according to FIG. 1 in a position in accordance with FIG. 2.

After those steps of assembling the optical fibre assembly, the housing upper body 38 is positioned above the housing lower body 2 and pressed against the same until both housing bodies 2, 38 contact each other at their partition 10. Due to this movement relative to each other, the sealing surfaces 56 and 58 of both pads 38, 42, come into contact with each other. The projections 10 force the gel sealing material into neighbouring recesses 48, 50. As can be learned from FIG. 2, the projections 70 being adjacent to the main recess 48 are more pronounced than the other projections 10. Accordingly, the main recess 48 having a larger width $W_D$ then the optional recesses 50 and receives more gel sealing material which is forced by those projections 70 towards the main recess 48. By the assigned projections 70, the upper part 64 of the assigned hutches 60, are pushed towards the main recess 48 and partially into dent 68. In the course of closing the housing, the upper parts 48 are pushed with a section of lateral wall 52 against the outer circumference of the optical cable 78 thereby fully enclosing the optical cable 78. In addition thereto, rim 26 acts a compression rim in the middle of each pad 32, 42, respectively. Local compression of the pads 32, 42 in their middle section assists in sealing the optical cable 78 and the cable dummies 82 immediately after closing of the housing. Due to those compression rims 26, instantaneous enclosing of the optical cable 78 and/or the cable dummies is attained, at least in a middle portion of those elements 78, 82, in the direction of introduction of said optical cable (from right to left according to FIG. 3). Further, upon closing the housing, the spring element 47 is pretensioned to provide an electric force assisting and maintaining the flow of the gel during the lifetime of the assembly.

With the housing closed and both housing bodies 2, 38 being clamped against each other, the gel sealing material may flow to further improve tight sealing of the ports provided for entering at least optical cable into the housing.

REFERENCE LIST 2 housing lower body
4 insert receiving recess
6 insert
8 seal groves
10 parting plane
12 trough
14 front face
16 inner surface
18 inner surface
20 inner holding rim
22 holding member rim
24 bottom
26 compression rim
30 sealing element
32 lower pad
34 lateral holding member
36 pin receiving opening
38 housing upper body
40 upper sealing element
42 upper pad
44 retaining device
46 trough
47 spring element
48 main recess
50 optional recess
51 recess of lateral holding member 34
52 lateral wall
54 lateral wall
56 sealing surface
58 sealing surface
60 hutch
62 lower part
64 upper part
68 dent
70 projection
72 lateral projection
74 lateral ramp
75 base
76 guide
77 dent
78 optical cable
79 rim
80 jacket
81 recess
82 cable dummy
84 film element
86 support film element
$W_D$ width of dent 68
$W_R$ width of recess 48
h height of compression rim 26
$H_{max}$ maximum extension of lower pad 32

The invention claimed is:

1. A housing for an optical fiber assembly comprising an housing upper body and an housing lower body, upper and lower sealing pads made of a gel sealing material, each of said pads being received in a trough provided by the housing upper and lower body, respectively, wherein said upper and lower pads are adapted to seal an element, when introduced into said housing, wherein at least one of said pads is held by a retaining device which is elastically supported against one of said housing bodies by means of a spring element and wherein the other of said housing bodies and/or said retaining device provides a contoured abutment surface for the assigned pads, the contoured abutment surfaces cooperate with the gel sealing material, such that the gel sealing material is urged to flow to improve instantaneous sealing of the housing upper and lower body in the sealing area provided by both pads.

2. The housing according to claim 1, wherein a rim extends in a direction transverse to the direction of introduction of said optical cable.

3. The housing according to claim 2, wherein said rim extends along the entire bottom of said trough.

4. The housing according to claim 2, wherein the rim projects a substantially flat bottom surface of said other of said housing bodies or said retaining device.

5. The housing according to claim 2, wherein said rim is arranged substantially in the middle of said at least one pad in the direction of introduction of said element.

6. The housing according to claim 2, wherein said rim has a height which is projecting the flat bottom of the trough of between 1 to 5 mm, or corresponding to 3% to 15% of the maximum height of the pad.

7. The housing according to claim 6, wherein said rim has a height which is projecting the flat bottom of the trough of between 2 to 3 mm, or corresponding to 5% to 10% of the maximum height of the pad.

8. The housing according to claim 1, wherein one of said pads is provided with at least one recess for receiving the element and the housing body or the retaining device assigned to the other of said pads comprises a projection being directed towards the one of said pads and adjacent to a lateral wall of said at least one recess.

9. The housing according to claim 8, wherein the surface of said one pad is contoured so as to form a hutch, a higher part thereof intersecting with a lateral wall of the recess and the lower part thereof being provided opposite to said projection.

10. The housing according to claim 9, wherein the other of said pads is provided with a dent arranged opposite to said recess with a width corresponding essentially to the width of the recess.

11. The housing according to claim 1, wherein at least one of said pads is sandwiched between lateral holding members, each of said lateral holding members having a bottom contour corresponding to a contour of a holding member rim projecting the bottom of the assigned housing body.

12. The housing according to claim 11, wherein said bottom contour of said lateral holding member is projected by said pad.

13. The housing according to claim 11, wherein each of said lateral holding members have a recess aligned with said element receiving recess, wherein said element receiving recess is smaller than said lateral holding member recesses.

14. The housing according to claim 11, wherein said lateral holding members are received between bottom holding rims projecting the bottom of the assigned housing body.

15. The housing according to claim 11, wherein the lateral holding members have holding pins which are received in pin receiving openings formed in said pad.

16. The housing according to claim 1, wherein one of said pads is provided with at least one recess for receiving an optional element, which can be introduced into said housing, that said housing houses an insert, said insert being adapted to hold at least one of said elements and being projected by at least one cable dummy aligned with said at least one optional recess.

17. The housing according to claim 16, wherein said cable dummy is secured to said insert by a film element adapted to be shorn off manually.

* * * * *